(12) United States Patent
Meggiolan

(10) Patent No.: US 7,651,172 B2
(45) Date of Patent: Jan. 26, 2010

(54) HUB BODY OF A SPOKED BICYCLE WHEEL

(75) Inventor: Mario Meggiolan, Creazzo (IT)

(73) Assignee: Campagnolo S.r.l., Vincenza (IT)

( * ) Notice: Subject to any disclaimer, the term of this patent is extended or adjusted under 35 U.S.C. 154(b) by 0 days.

(21) Appl. No.: 11/415,544

(22) Filed: May 2, 2006

(65) Prior Publication Data

US 2006/0255654 A1    Nov. 16, 2006

(30) Foreign Application Priority Data

May 2, 2005    (EP) ................... 05425280

(51) Int. Cl.
  *B60B 27/00*    (2006.01)
  *B60B 1/04*    (2006.01)
(52) U.S. Cl. ..................... 301/110.5; 301/59
(58) Field of Classification Search ................ 301/55, 301/56, 57, 59, 61, 104, 110.5, 67, 73, 74
  See application file for complete search history.

(56) References Cited

U.S. PATENT DOCUMENTS

| | | | | |
|---|---|---|---|---|
| 2,702,725 A * | 2/1955 | Lyman | ................. | 301/59 |
| 3,695,729 A * | 10/1972 | Schwerdhofer | ........ | 301/64.702 |
| 3,871,710 A * | 3/1975 | Dian et al. | ................. | 301/110.5 |
| 4,300,804 A * | 11/1981 | Hasebe | ................. | 301/110.5 |
| 5,882,088 A * | 3/1999 | Yahata | ................. | 301/110.5 |
| 5,947,565 A * | 9/1999 | Dietrich | ................. | 301/59 |
| 6,024,414 A * | 2/2000 | Dietrich | ................. | 301/59 |
| 6,068,349 A * | 5/2000 | Henderson et al. | ........... | 301/61 |
| 6,145,938 A * | 11/2000 | Dietrich | ................. | 301/59 |
| 6,238,008 B1 * | 5/2001 | Forsythe et al. | ............. | 301/55 |
| 6,244,667 B1 * | 6/2001 | Dietrich | ................. | 301/59 |
| 6,428,113 B2 * | 8/2002 | Dietrich | ................. | 301/59 |
| 6,588,853 B2 * | 7/2003 | Okajima | ................. | 301/58 |
| 6,679,561 B2 * | 1/2004 | Addink et al. | ............... | 301/55 |
| 6,871,915 B2 * | 3/2005 | Chiang et al. | ............... | 301/55 |
| 6,899,401 B2 * | 5/2005 | Schlanger | ................. | 301/59 |
| 2003/0127907 A1 * | 7/2003 | Chen | ................. | 301/55 |

FOREIGN PATENT DOCUMENTS

| | | |
|---|---|---|
| DE | 20200044 U1 | 5/2002 |
| DE | 20306761 U1 | 9/2004 |
| EP | 1201458 A1 * | 5/2002 |
| JP | 58071201 A * | 4/1983 |
| JP | 58071201 A | 4/1983 |

* cited by examiner

*Primary Examiner*—S. Joseph Morano
*Assistant Examiner*—Kip T Kotter
(74) *Attorney, Agent, or Firm*—Volpe and Koenig, P.C.

(57) ABSTRACT

A hub body of a spoked bicycle wheel comprises spoke attachment holes made in the hub body in a direction substantially parallel to a rotation axis of the hub body. Said holes comprise a first set of holes at a first radial distance from the rotation axis and a second set of holes at a second radial distance from the rotation axis, greater than the first radial distance.

34 Claims, 10 Drawing Sheets

HUB BODY OF A SPOKED BICYCLE WHEEL

FIELD OF INVENTION

The present invention refers to a hub body of a spoked bicycle wheel, in particular to a hub body of the type in which the spoke attachment holes are made in a direction substantially parallel to a rotation axis of the hub body; the present invention also refers to a hub and to a wheel comprising such a hub body.

BACKGROUND

With the term hub we generically mean the assembly of a hub body inside which a shaft is rotatably coupled through its ends to the bicycle frame; the hub body is joined to the rim of the wheel through a plurality of spokes and rotates integrally with it.

With the term "direction" referring to a spoke attachment hole we mean the main direction according to which such a hole extends through the hub body; such a direction is the one according to which a perforating tool shall ideally be arranged in the case in which the hole is made by chip removal; it is also the direction according to which the longitudinal axis of a portion of a spoke or of a spoke attachment element (for example a nipple) engaged in such a hole is arranged.

With the expression "substantially parallel to a rotation axis of the hub body" we mean a direction that differs from that of the rotation axis of the hub body (or in short of the hub) by an angle equal to zero or in any case a very small angle, not greater than 10°, thus in such a way that the portion of spoke or of spoke attachment element engaged in such a hole is substantially perpendicular to the main portion of the spoke itself.

Hubs of this type are known and widely used in racing bicycles.

In other types of wheels, the type of hub body used is, on the other hand, that in which the direction of the spoke attachment holes is substantially radial with respect to the rotation axis of the hub, and therefore the portion of spoke or of spoke attachment element engaged in such a hole is substantially aligned with the main portion of the spoke itself. This type normally allows better control of the stresses in the spokes and therefore more accurate and careful sizing with respect to structural resistance, weight and to aerodynamic resistance during rolling of the wheel.

A known hub body of this type is known, for example, in which the tubular central portion of the hub body extends along a main rotation axis and has spoke attachment parts at its ends consisting of protrusions distributed circumferentially (four protrusions for each end). In each protrusion a pair of spoke attachment holes is made, to receive the heads of two spokes, or to receive two attachment nipples at the threaded heads of the spokes; each hole has its axis belonging to a plane substantially perpendicular to the main rotation axis of the hub.

In a first group of solutions, the two holes of each pair have their axes offset with respect to each other both in the radial direction and in the axial direction, with reference to the main rotation axis of the hub.

The different axial positioning of the holes along the main axis determines a disadvantageous assembly configuration of the spokes that have two different inclinations (cambers) with respect to the middle plane of the wheel passing through the rim.

A second solution overcomes the drawback of the different cambers of the spokes since the two holes of each pair belong to the same plane perpendicular to the main axis of the hub and are therefore axially aligned.

To satisfy particular requirements, for example for aesthetic reasons or else to increase the number of spokes, it is sometimes necessary to increase the number of spoke attachment holes distributing them circumferentially in groups of three or more holes.

The addition of one or more holes in the aforementioned protrusion containing the pair of axially aligned holes would require increasing the radial size of the protrusion itself to allow the further holes to be made. Moreover, the increase in the number of spokes associated with each protrusion increases the size of the flexing forces acting upon the protrusion requiring that it be widened so as to be able to ensure sufficient structural strength. The increase in the radial size of the protrusions and their thickening means an increase in weight of the hub body and greater aerodynamic resistance during movement.

Hub bodies in which axial spoke attachment holes are provided that are arranged on more than one circumference are not known.

There is therefore the problem of making a hub body that allows greater freedom in the arrangement of the spokes, in particular that allows the spoke attachment holes to be grouped into groups of three or more holes, and that at the same time can ensure low size and weight compared to known hubs.

SUMMARY

Therefore, the present invention refers to a hub body as defined in its most general terms in claim 1, to a hub as defined in claim 17 and to a wheel as defined in claim 18. Preferred optional characteristics are given in the dependent claims.

BRIEF DESCRIPTION OF THE DRAWING(S)

Further characteristics and advantages of the present invention shall become clearer from the following detailed description of some preferred embodiments thereof, made with reference to the attached drawings.

DETAILED DESCRIPTION OF THE PREFERRED EMBODIMENT(S)

Introduction

Figure 1:
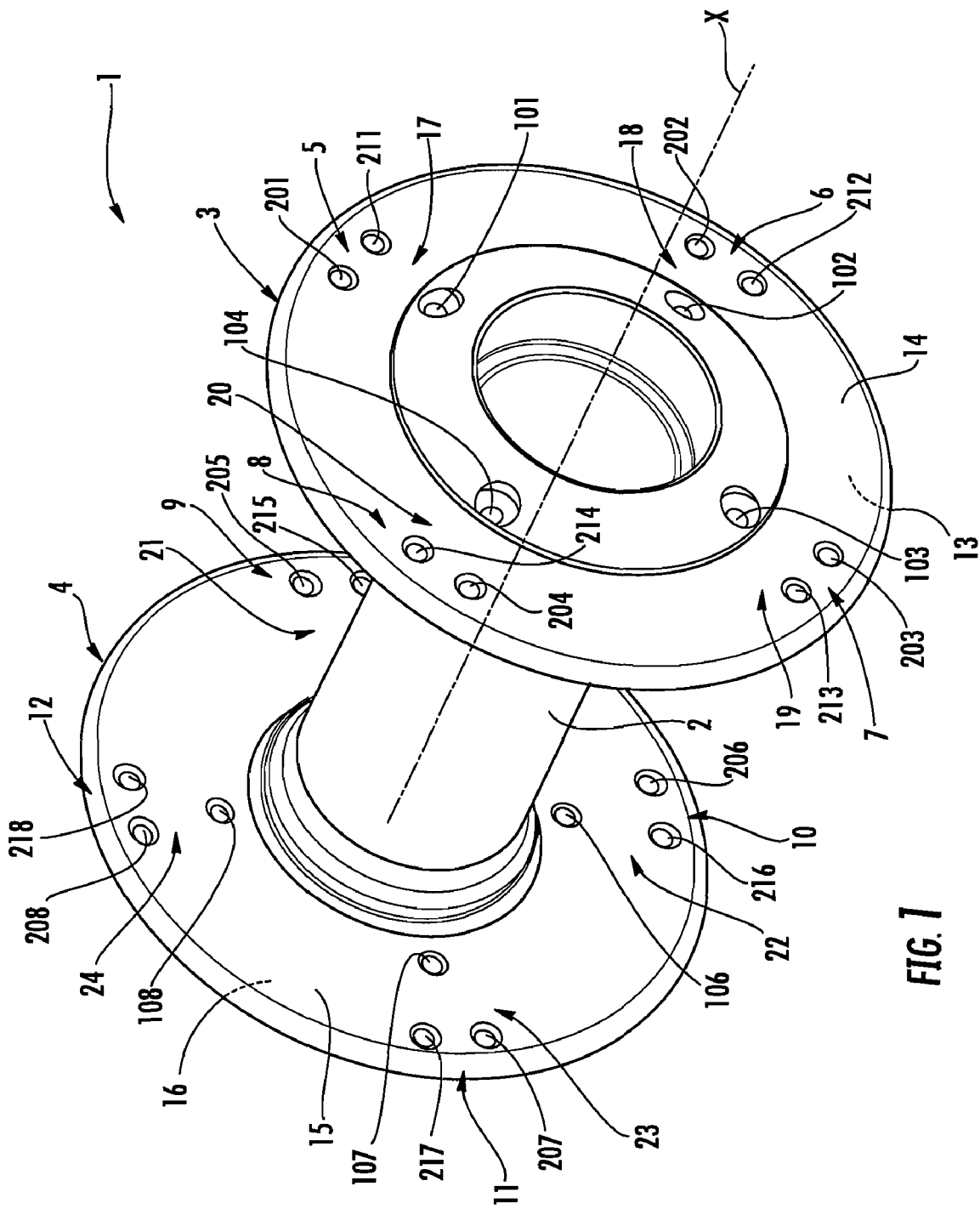
FIG. 1 is an axonometric view of a hub body according to a first embodiment of the invention, for a front bicycle wheel.

More specifically, in a first aspect of the invention, a hub body comprises spoke attachment holes made in the hub body in a direction substantially parallel to a rotation axis of the hub, and it is characterised in that said holes comprise a first set of holes at a first radial distance from the rotation axis and a second set of holes at a second radial distance from the rotation axis, greater than the first radial distance.

Such a hub body allows great freedom in the choice of the arrangement of the spokes, without however making the hub body itself heavier, and without introducing aerodynamic problems.

Preferably, the hub body comprises two flanges, extending radially with respect to the rotation axis of the hub and axially spaced apart, in which the spoke attachment holes are made in the flanges. This is the classic configuration of a hub body with axial spoke attachment holes, and it is thus preferred for simplicity of both construction and design; it is nevertheless possible for the actual flanges themselves to be left out, and for the spoke attachment holes to be made directly at the axial ends of the hub body. It should however be noted that the term "flange" should be taken broadly to mean a substantially flattened portion extending radially around the rotation axis of the hub, both substantially continuously for all 360° and discontinuously, i.e. with flange portions separated by empty spaces.

Preferably, at least one of said flanges—and more preferably both—comprises identical groups of said spoke attachment holes, each group comprising n holes with $n \geq 3$, in which p holes of each group belong to the first set of holes and q holes of the same group belong to the second set of holes, wherein $n \geq p+q$.

In each group of holes, holes can be provided that do not belong to either the first or second set and are thus placed at different radial distances than those of the holes of the first and second set, or—preferably—only holes belonging to either one or the other of the first and second set, i.e. $n=p+q$.

In a preferred version of the invention, the holes of each group that belong to the first set, i.e. those arranged closest to the rotation axis of the hub, are no greater in number than the number of holes that belong to the second set, i.e. $p \leq q$. This characteristic avoids having many holes where a smaller circumferential extension is available, and this is particularly appreciable the greater the number of spokes of the wheel. However, in a less preferred version of the invention but which is in any case useful, above all in the case of wheels with a small number of spokes, the holes of each group that belong to the first set, i.e. those arranged closest to the rotation axis of the hub, can be more than the holes that belong to the second set, i.e. $p>q$.

Preferably, each group of holes comprises three holes, one of which belongs to one of the two sets, the other two holes to the other set. Alternatively, each group of holes can comprise four holes, two of which belong to one of the two sets, the other two holes to the other set. Alternatively again, each group of holes can comprise five holes, two of which belong to one of the two sets, the other three holes to the other set. Configurations of groups with more than five spoke attachment holes are equally possible.

Preferably, at least one of the flanges—and more preferably both—has an axial thickness that decreases as the distance in the radial direction from the rotation axis increases. This configuration allows both better aerodynamics, and a reduction of the mass of the hub body where it is under the least stress, i.e. where the mechanical stresses of just a part of the spokes of the wheel discharge.

Preferably, at least one of the flanges—and more preferably both—comprises lightening zones, for example formed by removal of material. In this way, above all in the case of wheels in which the distribution of the spokes is very irregular, it is possible to significantly reduce the mass of the hub body in the zones where no spokes are connected. More preferably, the lightening zones comprise openings through said at least one flange, formed in zones of the flange located between two adjacent groups of holes; such openings can also be along the entire radial extension of the flange, which in such a way is substantially discontinuous, i.e. with flange portions separated by empty spaces. Alternatively, the aforementioned openings can be formed in zones of the flange located between spoke attachment holes of the same group of holes.

Preferably, the spoke attachment holes comprise flarings, to promote the coupling with the spokes of the wheel. Even more preferably, some of the flarings—in particular and preferably those of the holes of the first set facing towards the outer surfaces of the flanges—comprise a frusto-conical portion and a cylindrical portion, to house the heads of the spokes attached at such holes so that they are protected.

In a second aspect, then, the present invention concerns a hub comprising a hub body according to what indicated.

Finally, in a third aspect, the present invention concerns a bicycle wheel, comprising a rim, a hub body of the aforementioned type, and spokes connected to the rim and to the hub body at the spoke attachment holes.

Preferably, the spokes of the wheel are grouped into spoke groups, each consisting of a central spoke and two side spokes, more preferably parallel to each other. Such a grouping of spokes allows an optimal distribution of the stresses between the various spokes, and also gives it a pleasant appearance.

Preferably, the first and second radial distance and the position of the spoke attachment holes are such that the spokes of each spoke group have the same length; this allows greater practicality and cost-effectiveness of use, since it does not oblige differentiation between the various spokes.

Preferably, the spoke attachment holes are split into equal groups of three spoke attachment holes each, in which a hole of each group belongs to the first set of holes and two holes of the same group belong to the second set of holes, wherein the three spokes of each spoke group are connected to the hub body at spoke attachment holes belonging to three different groups.

DETAILED DESCRIPTION

FIG. 1 represents a hub body 1 in accordance with the invention, which comprises a central tubular body 2, extending along a main rotation axis X. At the ends of the tubular body 2 a first flange 3 and a second flange 4 for the attachment of the spokes are provided. The hub body 1 is preferably made from metal, in particular aluminium, but alternatively it could be made from a different material, like for example carbon fibre. Four spoke attachment zones 5-8, arranged angularly at 90° one from the other, are defined on the first flange 3. Four spoke attachment zones 9-12 arranged angularly at 90° one from the other and angularly offset by 45° with respect to the spoke attachment zones 5-8 of the first flange 3, are defined on the second flange 4.

Each spoke attachment zone 5-12 of the first and second flange 3 and 4 comprises a respective group of spoke attachment holes 17-24, extending between the inner surface 13, 15 and the outer surface 14, 16 of the respective flange 3, 4; with the indication "inner" and "outer" for the aforementioned surfaces it is meant to refer, respectively, to the surfaces facing towards the tubular body 2 and to those facing the opposite way. Each group includes a plurality of spoke attachment holes. The distance separating any two spoke attachment holes of a given group is less than a distance separating any one of the spoke attachment holes of that group from another spoke attachment hole not belonging to that group.

Figure 2:
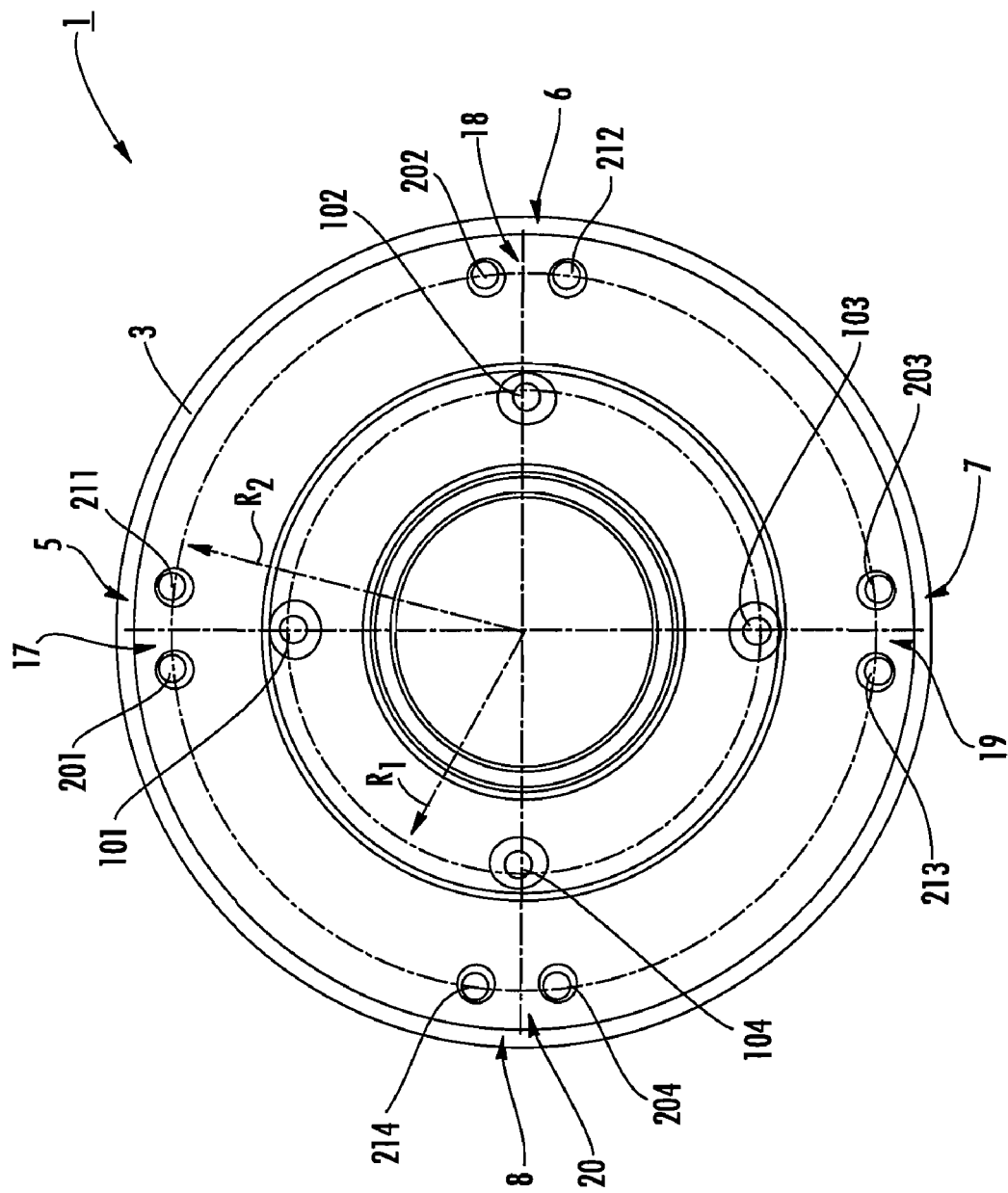
FIG. 2 is a side view along the rotation axis of the hub of FIG. 1.

Each of the groups 17-24 comprises a first hole or inner hole 101-108 and two second holes or outer holes 201-208 and 211-218. All of the aforementioned holes extend with their own axis parallel to the main axis X of the hub body 1; the first holes 101-108 are at a first radial distance $R_1$ (see FIG. 2); the second two holes 201-208 and 211-218 are at a radial distance $R_2$ greater than $R_1$. The assembly of the first holes of each flange 3 or 4 forms a first set of spoke attachment holes, as well as the assembly of the second holes of each flange 3 or 4 forms a second set of spoke attachment holes.

Figure 3:
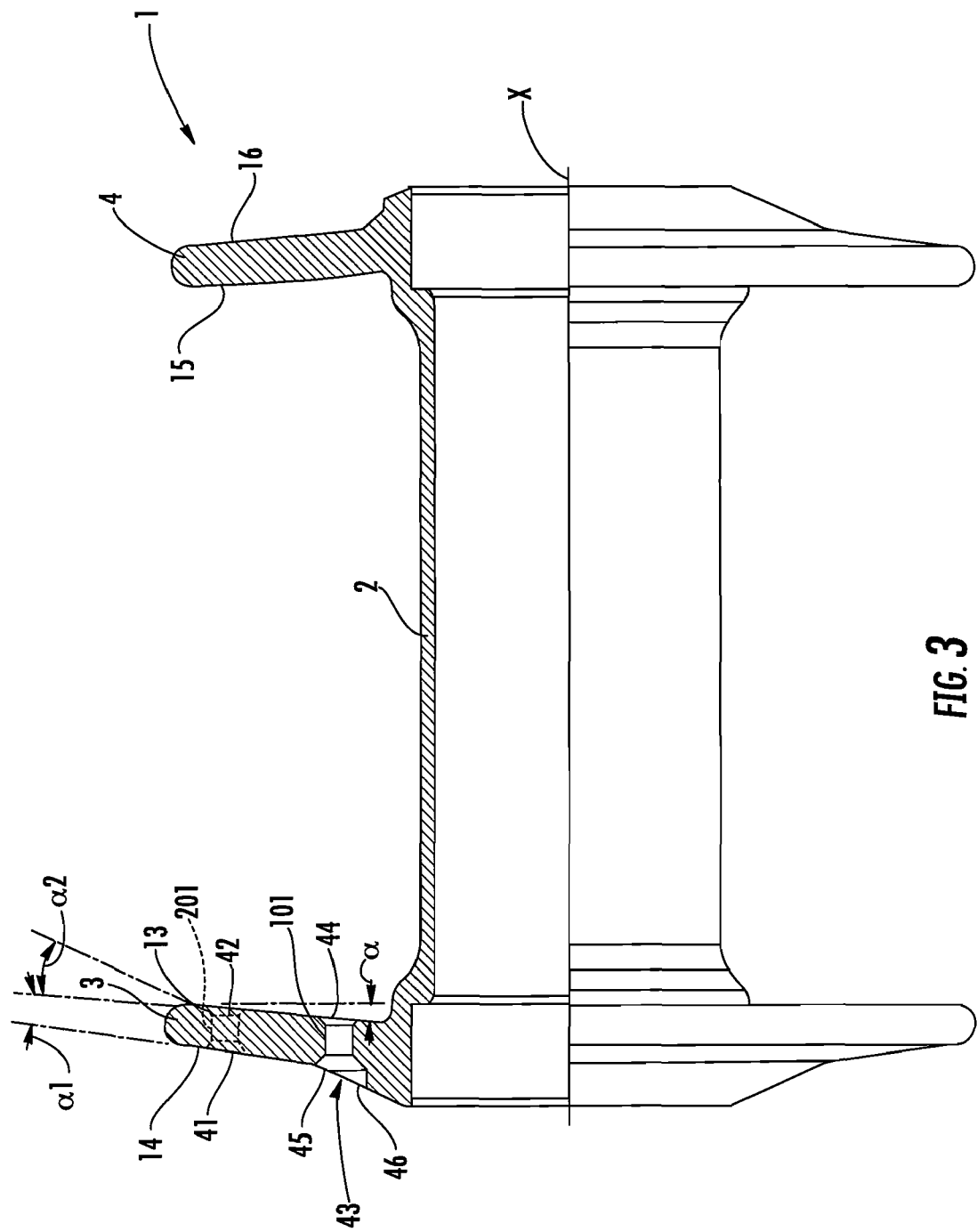
FIG. 3 is a partial section view of the hub body of FIG. 1 according to a plane passing through its axis.

With reference to FIG. 3, the inner surfaces 13, 15 and the outer surfaces 14, 16 of the flanges 3, 4, which define the thickness of the flanges 3, 4 themselves, extend with a progression not parallel to each other. In particular, in the radially outer zones of the flanges 3, 4 where the second holes or outer holes 201-208 and 211-218 of each group 17-24 are located, the inner surfaces 13, 15 and outer surfaces 14, 16 are flat and inclined with respect to each other by an angle $\alpha 1$ of 2°, so that they define a thickness for the flange 3, 4 in the axial direction that slightly decreases away from the axis X of the hub body 1. In the radially inner zones of the flanges 3, 4 where the first holes or inner holes 101-108 of each group 17-24 are located, the inner surfaces 13, 15 and outer surfaces 14, 16 are flat and inclined with respect to each other to a greater degree (angle $\alpha 2$ of about 18.5°) so that they define a further thickening for the flange 3, 4 towards the axis X of the hub body 1. Such an increase in thickness of the flanges 3, 4 from the outer radial zones to the inner radial zones allows a greater structural strength of the flanges 3, 4 themselves in the inner radial zones that are subjected to the mechanical stresses of all three spokes.

Each flange 3, 4 is also inclined by an angle $\alpha$ (about 5°) with respect to a plane perpendicular to the axis X of the hub body 1 and such an inclination substantially follows the desired camber angle for the spokes of the wheel.

Figure 4:
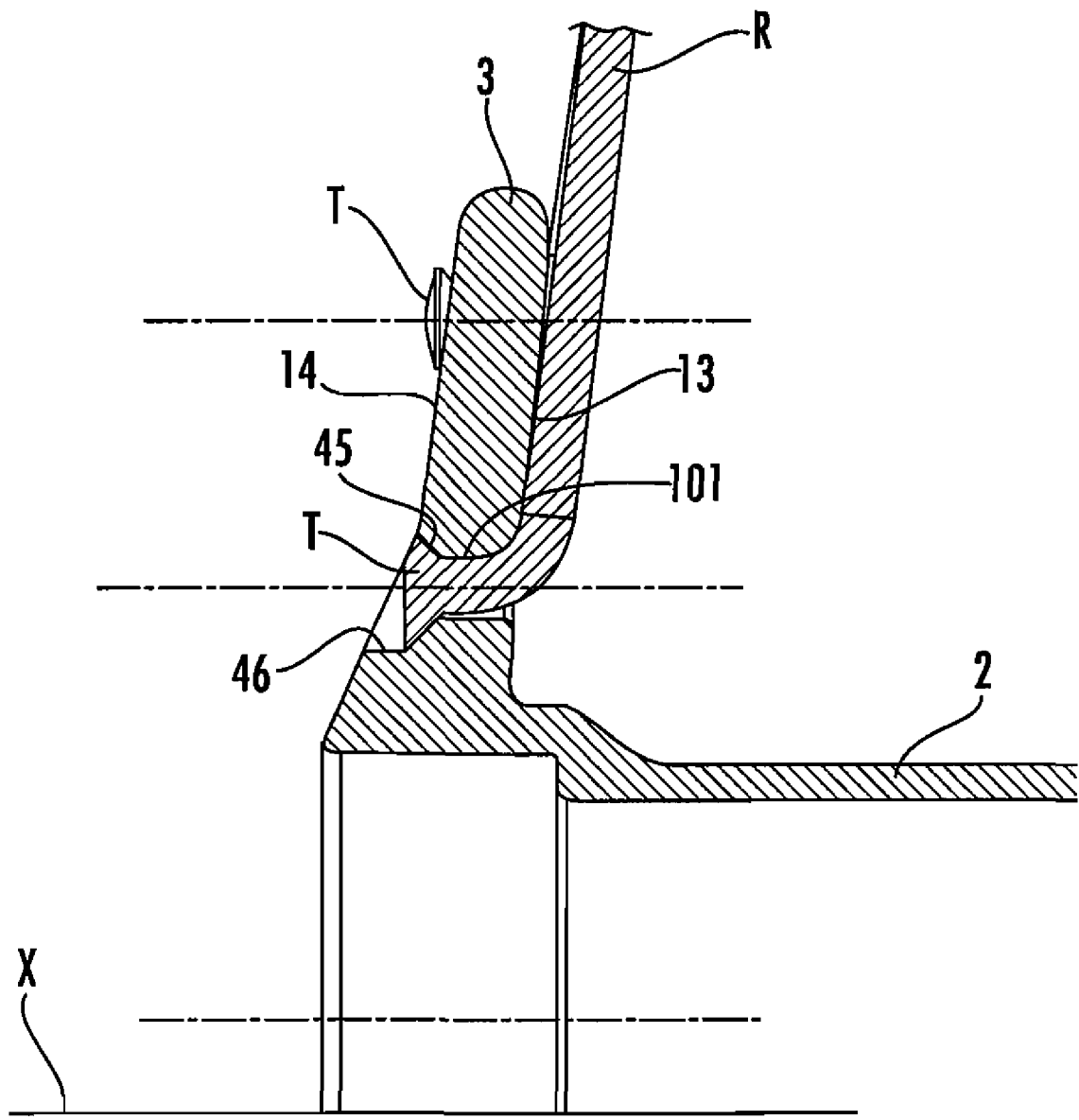
FIG. 4 is a partial section view of a detail of the hub body of FIG. 1 according to a plane passing through its axis with the spokes mounted.

With reference to FIGS. 3 and 4, each spoke attachment hole, outer 201-208 and 211-218 and inner 101-108, respectively comprises flarings 41 and 43 towards the outer surface 14 or 16 of the flange 3 or 4, suitable for promoting the coupling with the head T of a spoke R. Towards the inner surface 13 or 15, each spoke attachment hole, outer 201-208 and 211-218 and inner 101-108, respectively comprises flarings 42 and 44 to promote the coupling with the bent zone of the spoke R that then extends towards the rim C of the wheel A. For the outer holes 201-208 and 211-218, the flarings 41 towards the outer surface 14, 16 and the flarings 42 towards the inner surface 13, 15 are formed from frusto-conical portions. For the inner holes 101-108, the flarings 44 towards the inner surface 13, 15 are formed from a frusto-conical portion whereas the flarings 43 towards the outer surface 14, 16 comprise a frusto-conical section 45 and a cylindrical section 46 that completely house the head T of the spoke R (as can be seen in FIG. 4). The flarings 41-44 of the holes 101-108, 201-208, 211-218 allow the sharp contact edges between the spokes R and the hub body 1 to be eliminated, which could give rise to disadvantageous incision zones and therefore potential breaking for the spoke R.

Figures 5, 6:
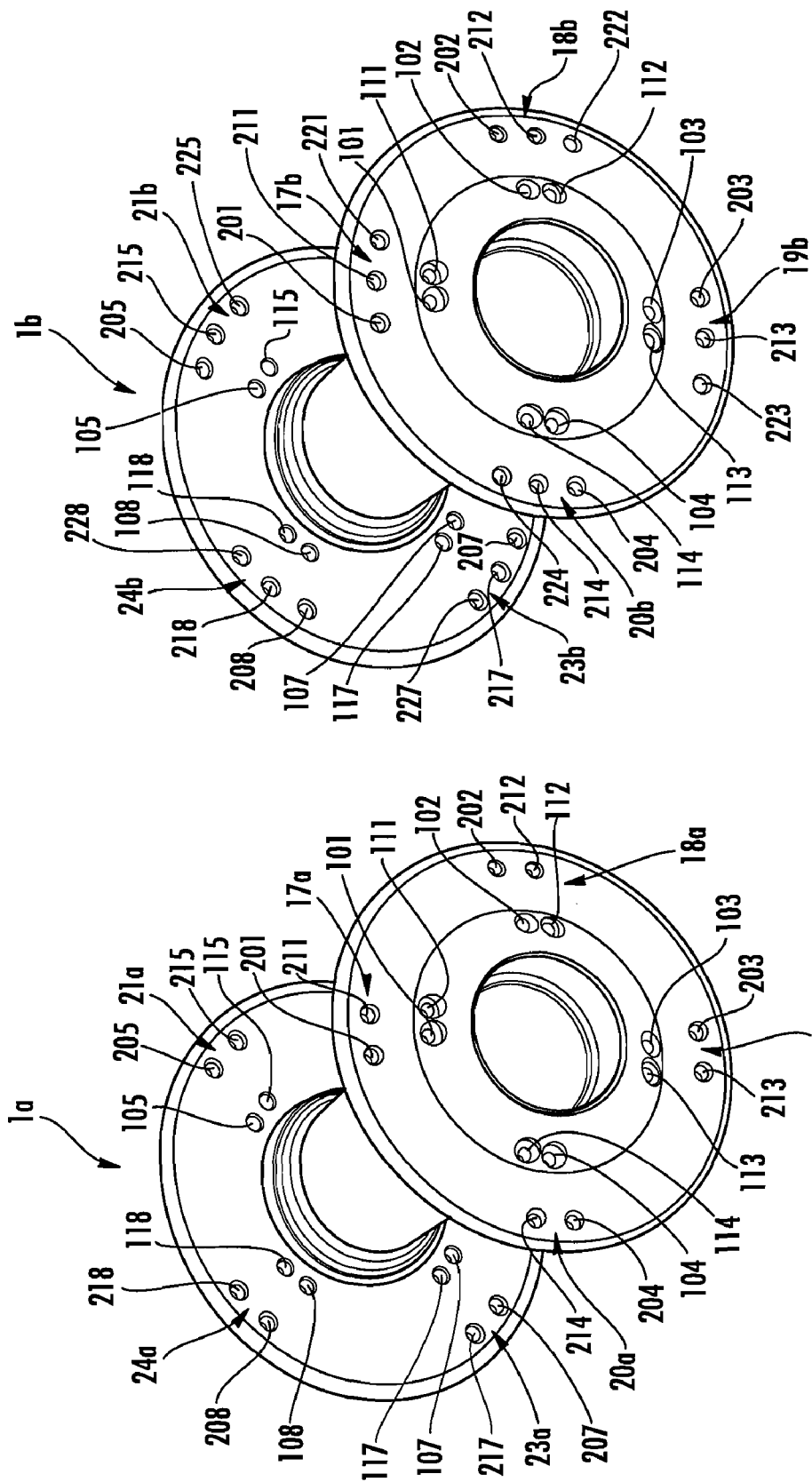
FIG. 5 is an axonometric view of a hub body according to a second embodiment of the invention.
FIG. 6 is an axonometric view of a hub body according to a third embodiment of the invention.

In FIG. 5 a hub body 1a in accordance with a second embodiment of the invention is represented, which differs from the hub body 1 of the first embodiment represented in FIGS. 1 to 4 in that each group of spoke attachment holes 17a-24a comprises four instead of three spoke attachment holes, extending between the inner surface 13, 15 and the outer surface 14, 16 of the respective flange 3, 4. Each of such groups 17a-24a thus comprises two first holes or inner holes 101-108 and 111-118, and two second outer holes 201-208 and 211-218.

In FIG. 6 a hub body 1b in accordance with a third embodiment of the invention is represented, which differs from the hub body 1 of the first embodiment represented in FIGS. 1 to 4 in that each group of spoke attachment holes 17b-24b comprises five instead of three spoke attachment holes, extending between the inner surface 13, 15 and the outer surface 14, 16 of the respective flange 3, 4. Each of such groups 17b-24b thus comprises two first holes or inner holes 101-108 and 111-118, and three second outer holes 201-208, 211-218 and 221-228.

Figure 7:
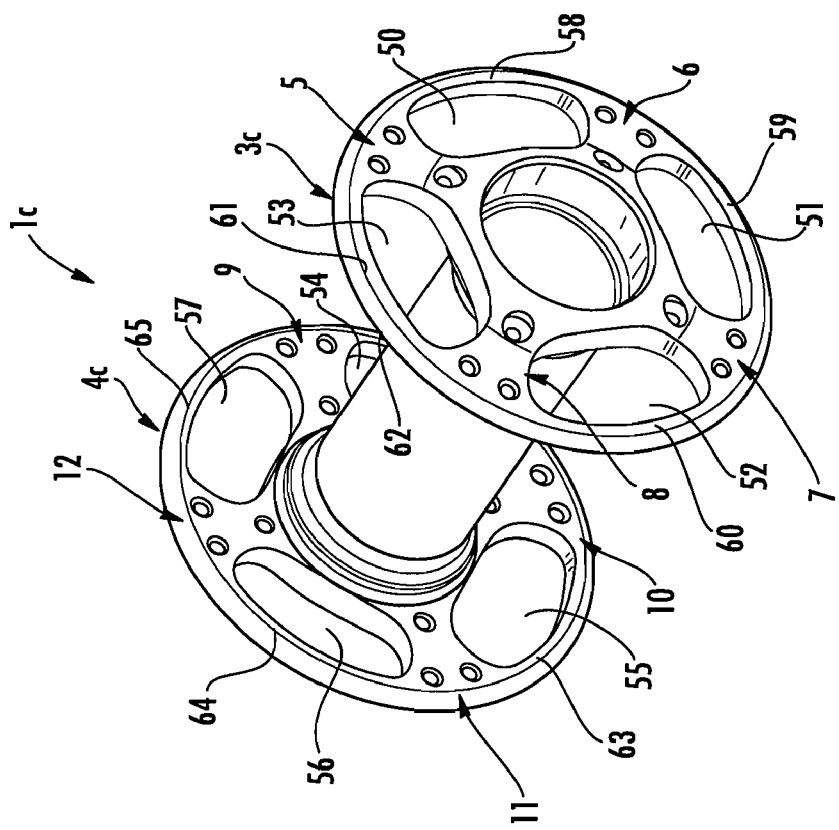
FIG. 7 is an axonometric view of a hub body according to a fourth embodiment of the invention.

In FIG. 7 a hub body 1c in accordance with a fourth embodiment of the invention is represented, which differs from the hub body 1 of the first embodiment represented in FIGS. 1 to 4 in that between two adjacent spoke attachment zones 5-12 each flange 3c, 4c comprises lightening zones formed from openings 50-57; such openings 50-57 are externally limited by corresponding connection bridges 58-65 between the adjacent spoke attachment zones of the flanges 3c, 4c. The lightening openings 50-57 are preferably obtained by removal of material and allow the weight of the hub body 1c to be reduced.

Figure 8:
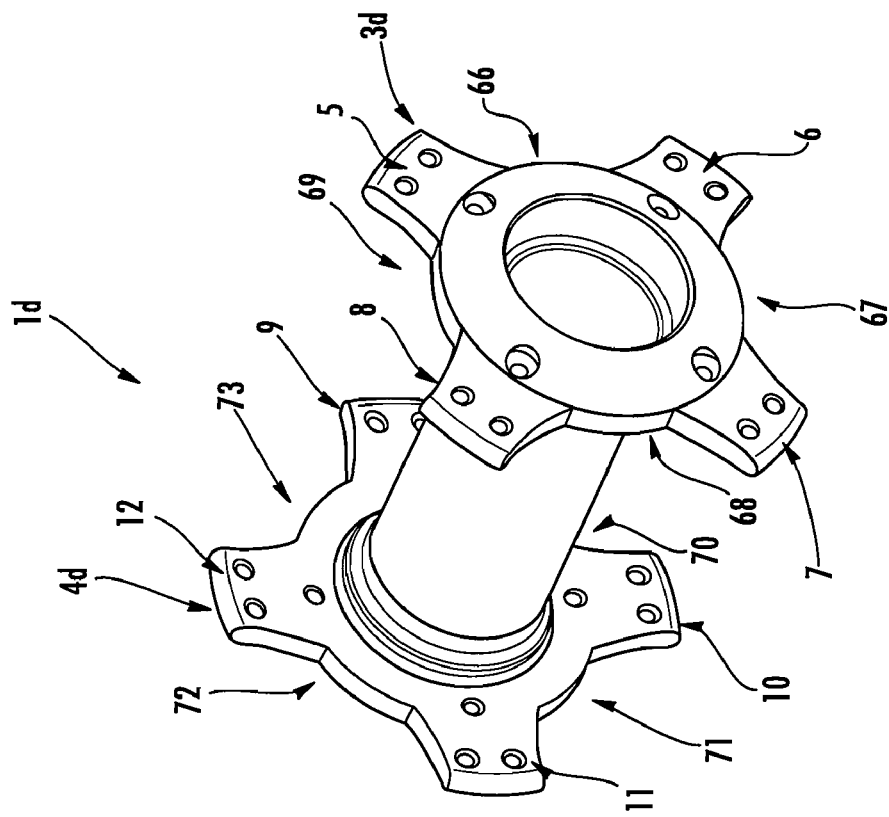
FIG. 8 is an axonometric view of a hub body according to a fifth embodiment of the invention.

In FIG. 8 a hub body 1d in accordance with a fifth embodiment of the invention is represented, which differs from the hub body 1c of the fourth embodiment represented in FIG. 7 in that the lightening zones of the first and second flange 3d and 4d are formed from openings 66-73 not radially limited towards the outside; in other words, there are no connection bridges between the adjacent spoke attachment zones 5-12. Advantageously, such a solution allows a further decrease in the weight of the hub body 1d.

Figure 9:
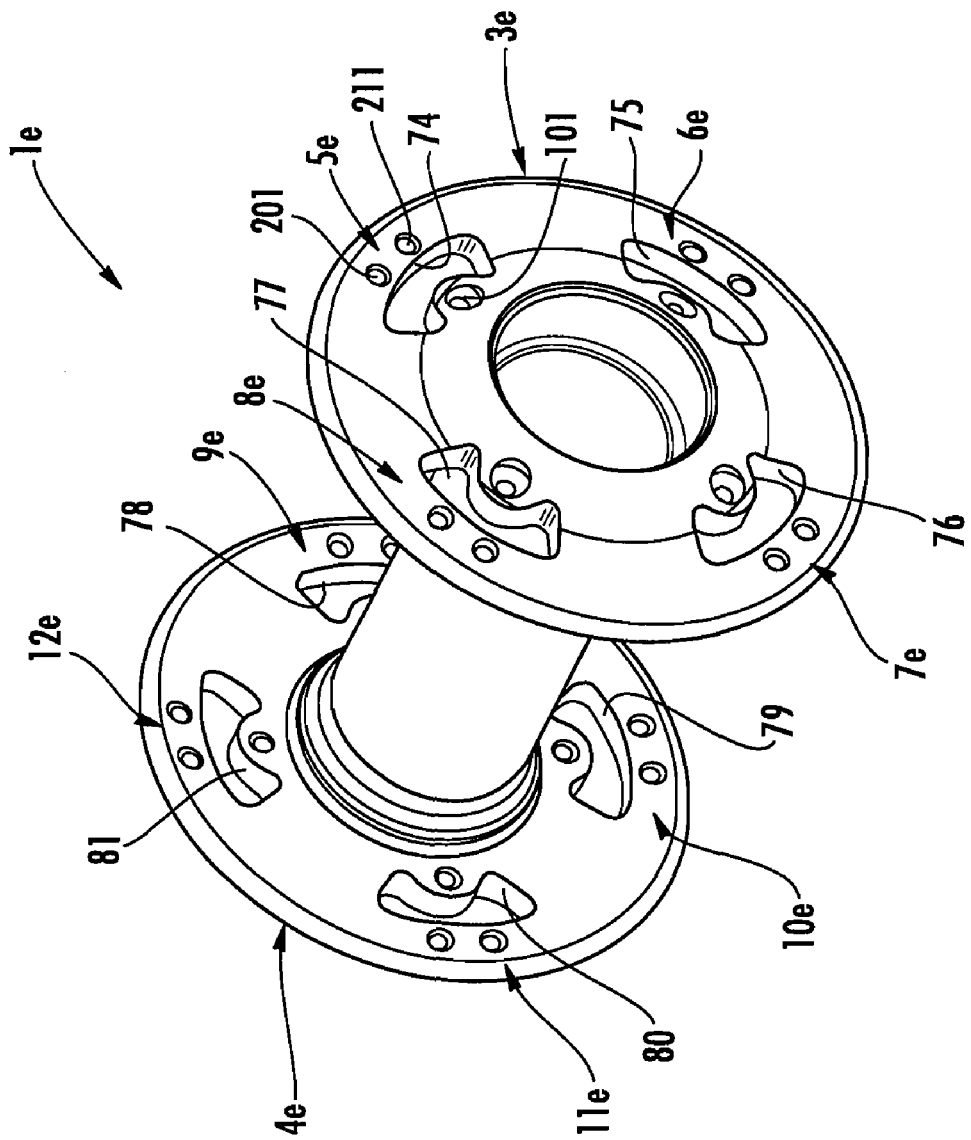
FIG. 9 is an axonometric view of a hub body according to a sixth embodiment of the invention.

In FIG. 9 a hub body 1e in accordance with a sixth embodiment of the invention is represented, which differs from the hub body 1c of the fourth embodiment represented in FIG. 7 in that the lightening zones of the first and second flange 3e and 4e are formed from openings 74-81, each of which is formed in a respective spoke attachment zone 5e-12e, between the inner hole 101-108 and the two outer holes 201-208 and 211-218 of the groups of holes 17-24. In such an embodiment, unlike the embodiments described previously, the forces to which the outer holes 201-208 and 211-218 of the groups 17-24 are subjected are distributed on a path that covers the zones (solid, i.e. not lightened) between two adjacent spoke attachment zones 5e-12e, whereas the zone where the inner hole of the set of holes 101-108 is made, since it is separated by the lightening opening 74-81, is only marginally affected by the forces to which the outer holes 201-208 and 211-218 of the groups 17-24 are subjected.

Figure 10:
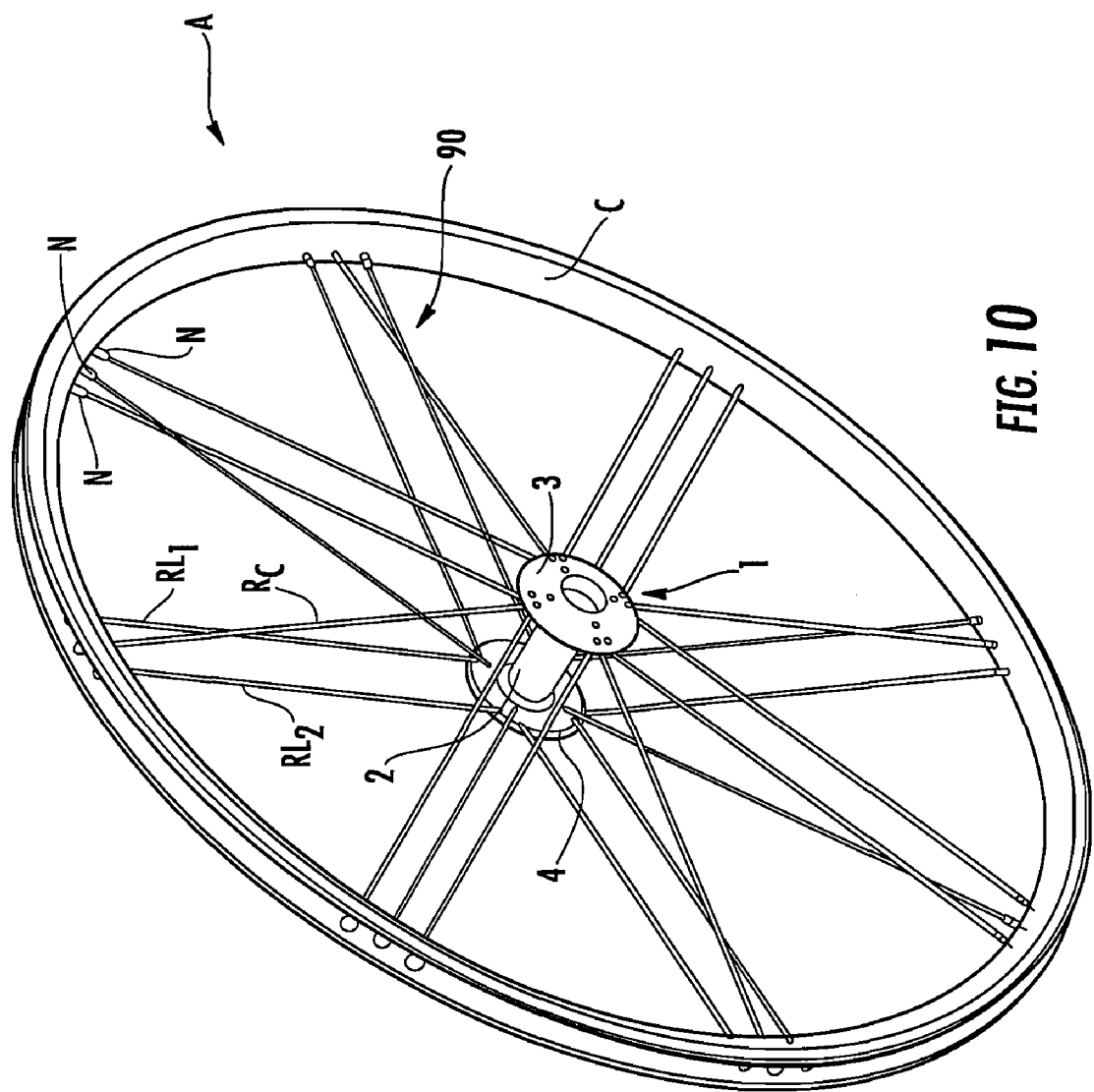
FIG. 10 is an axonometric view of a wheel in which the hub body of FIG. 1 is mounted.
Figure 11:
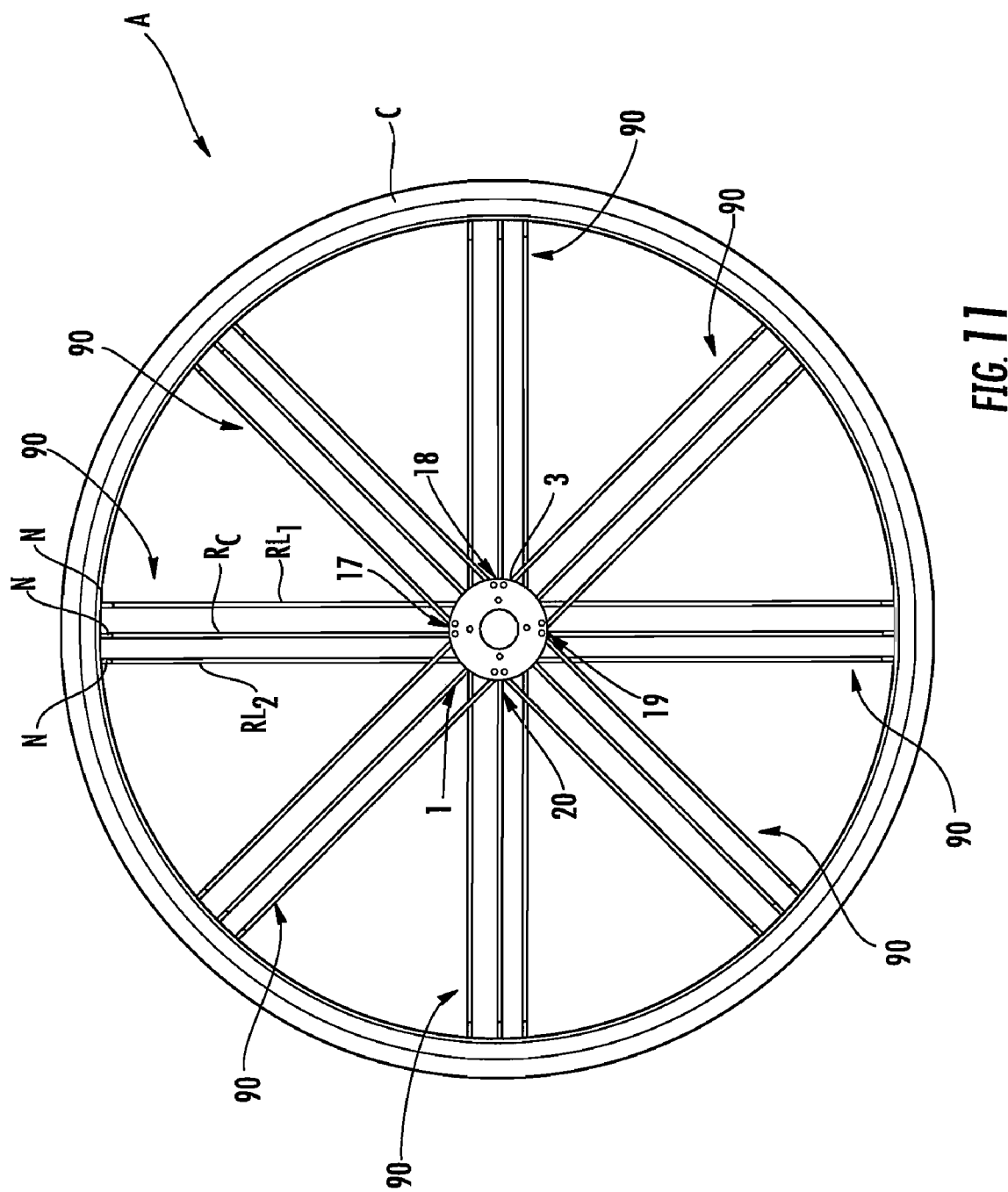
FIG. 11 is a side view along the axis of the wheel of FIG. 10.

In FIGS. 10 and 11 the hub body 1 of the invention of FIG. 1 is shown as mounted in a front wheel A. What has been illustrated can easily be extended to the case of a front wheel using the hub body 1c, 1d and 1e of the embodiments represented in FIGS. 7, 8 and 9, since they are all characterised by the presence of the same type of groups 17-24 of three spoke attachment holes for each spoke attachment zone 5-12 or 5e-12e.

As can clearly be seen in FIGS. 10 and 11, the arrangement of the spoke attachment zones 5-12 of the two flanges 3, 4 and the arrangement of the spokes R themselves, between the hub body 1 and the rim C, give the wheel A an eight-spoke groups 90 appearance (in FIG. 10 only one of them is numbered for the sake of simplicity of explanation), each spoke group 90 being formed from a grouping of three spokes Rc, $Rl_1$, $Rl_2$ for a total of twenty-four spokes for the wheel A. The spokes are equally distributed on the two sides of the wheel A, in which the first side comprises the spokes that join the rim C to the first flange 3 and the second side comprises the spokes that join the rim C to the second flange 4. Each spoke group 90, as stated, consists of three spokes Rc, $Rl_1$, $Rl_2$ in which each spoke is inclined by a camber angle (about 5°) with respect to the middle plane that contains the rim C whereas, in a side view (see FIG. 10), the three spokes Rc, $Rl_1$, $Rl_2$ are parallel to each other.

More specifically, as can be seen mainly in FIG. 10, each grouping of three spokes Rc, $Rl_1$, $Rl_2$ in one spoke group 90 consists of a central spoke Rc belonging to the first (second) side of the wheel A and two side spokes $Rl_1$, $Rl_2$ belonging to the second (first) side of the wheel A. The central spoke Rc is connected at one end to the rim C, through a nipple N or other spoke attachment element, and at the other end to the inner hole 101-104 (105-108) of the first (second) flange 3 (4). The two side spokes $Rl_1$, $Rl_2$ are connected at one end to the rim C, through nipples N or other spoke attachment elements, and at the other end to the outer holes 205-208 and 215-218 (201-204 and 211-214) of two adjacent groups of spokes of the second (first) flange 4 (3).

In the embodiment shown, the central spoke Rc is longer than the two side spokes $Rl_1$, $Rl_2$, which are, on the other hand, the same as each other. In a different embodiment, the inner hole 101-108 could be made at a distance $R_1'$ greater than $R_1$, and in any case smaller than $R_2$, in such a way that the central spoke Rc is the same length as the side spokes $Rl_1$, $Rl_2$.

Figure 12:
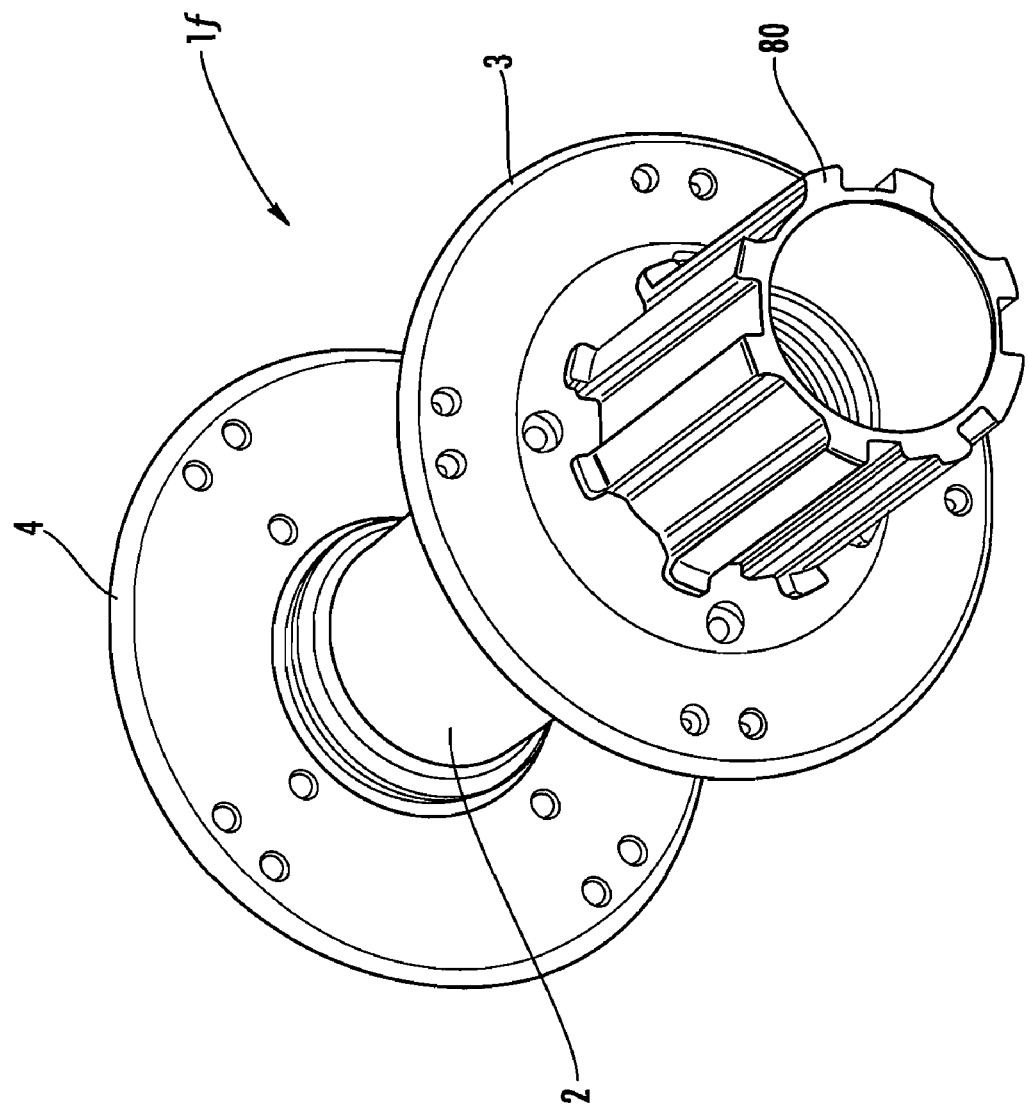
FIG. 12 is an axonometric view of a hub body according to the first embodiment of the invention, for a rear bicycle wheel.

The hub bodies 1, 1a, 1b, 1c, 1d and 1e that can be seen in FIGS. 1 to 11 are hub bodies intended for front wheels, with no sprocket-carrying body for use in a rear wheel being provided. It is nevertheless clear that analogous hub bodies for rear wheels can be made by simply adding a sprocket-carrying body to the side of one of the flanges. In FIG. 12—as an example—a hub body if analogous to the hub body 1 represented in FIGS. 1 to 4 is shown, however provided with a sprocket-carrying body 80 for use in a rear wheel.

The hub bodies 1, 1a, 1b, 1c, 1d, 1e and 1f that can be seen in figures are substantially symmetrical on the two sides with respect to the middle plane that contains the rim of the wheel (apart from said angular staggering by 45° and the possible presence of the sprocket-carrying body), and for such a purpose the two flanges 3 and 4 are equally substantially symmetrical. Such hub bodies are thus suitable for a wheel, front or rear, with symmetrical spoking. To make (rear) wheels with non-symmetrical spoking, it shall of course be necessary to use equally non-symmetrical hub bodies, i.e. with the flanges 3 and 4 different to each other and in particular provided with a different number of spoke attachment holes, so as to have a wheel with a different number of spokes on the two sides; typically, one flange can have double the number of spoke attachment holes with respect to the other.

The flanges of a hub body according to the invention have been illustrated as made integrally with the central tubular body, and this shall be the typical configuration. However, it is also possible for such flanges to be made as separate bodies, and then coupled with the central tubular body. As already stated, it is then possible for the flanges to be left out completely, and in such a case the spoke attachment holes shall be formed directly on the axially opposite end surfaces of the central tubular body of the hub body.

What is claimed is:

1. Hub body of a spoked bicycle wheel, comprising two flanges, each flange having identical groups of spoke attachment holes having circular shapes defined in the flange in a direction substantially parallel to a rotation axis of the hub body, and lightening zones defined by holes, separate from each spoke attachment hole, in at least one of the flanges between adjacent groups of holes, each group comprising at least three spoke attachment holes spaced at distances from each other, wherein the distance between any two spoke attachment holes in a first group is less than a distance separating any one of the spoke attachment holes in the first group from a nearest spoke attachment hole not belonging to the first group, and wherein said spoke attachment holes comprise a first set of spoke attachment holes at a first radial distance from the rotation axis and a second set of spoke attachment holes at a second radial distance from the rotation axis, greater than the first radial distance.

2. Hub body according to claim 1, wherein the two flanges extend radially with respect to the rotation axis of the hub body and are axially spaced apart from each other.

3. Hub body according to claim 2, wherein each group comprises n spoke attachment holes with $n \geq 3$ wherein p spoke attachment holes of each group belong to the first set of spoke attachment holes and q spoke attachment holes of the same group belong to the second set of spoke attachment holes, wherein $n \geq p+q$.

4. Hub body according to claim 3, wherein $n=p+q$.

5. Hub body according to claim 3, wherein $q \geq p$.

6. Hub body according to claim 3, wherein $n=3$, $p=1$ and $q=2$.

7. Hub body according to claim 2, wherein at least one of the flanges has an axial thickness that decreases as the distance in the radial direction from the rotation axis increases.

8. Hub body according to claim 2, wherein the spoke attachment holes comprise flarings.

9. Hub body according to claim 8, wherein at least one of the flarings comprises a frusto-conical section and a cylindrical section.

10. Hub body according to claim 2, wherein both of the flanges comprise lightening zones.

11. Hub body according to claim 10, wherein the lightening zones are formed by removal of material.

12. Hub body according to claim 1, wherein the lightening zones are formed in zones of the flange located between two adjacent groups of spoke attachment holes.

13. Hub of a bicycle wheel, comprising a hub body according to claim 1.

14. Bicycle wheel, comprising a rim, a hub body according to claim 1, and spokes connected to the rim and to the hub body at the spoke attachment holes.

15. Wheel according to claim 14, wherein the spokes are grouped in spoke groups, each consisting of a central spoke and two side spokes.

16. Wheel according to claim 14, wherein the three spokes of each spoke group are parallel to each other.

17. Wheel according to claim 16, wherein the spoke attachment holes are distributed into equal groups of three spoke attachment holes each, wherein one spoke attachment hole of each group belongs to the first set of spoke attachment holes and two holes of the same group belong to the second set of spoke attachment holes, wherein the three spokes of each spoke group are connected to the hub body at spoke attachment holes belonging to three different groups.

18. The hub of claim 1, wherein the flange defines a continuous circular perimeter comprising:
spoke attachment zones extending between the hub and perimeter the spoke attachment zones comprising the groups of spoke attachment holes, and the lightening zones defined by holes or openings separating the spoke attachment zones.

19. Hub body of a spoked bicycle wheel comprising flanges and groups of spoke attachment holes defined in at least one of the flanges in a direction substantially parallel to the rotational axis of the hub body and lightening zones, each group of spoke attachment holes comprising three or more spoke attachment holes defined in a common one of the flanges and spaced at distances from each other, wherein the distance between any two spoke attachment holes in a first group is less than a distance separating any one of the spoke attachment holes in the first group from a nearest spoke attachment hole not belonging to the first group and the lightening zones comprise openings through said at least one flange, formed in zones of the flange located between spoke attachment holes of a same group of spoke attachment holes.

20. A hub body comprising:
a rotation axis;
two flanges extending radially outward from the rotational axis and having circular perimeters, each flange comprising lightening zones defined by openings that interrupt the circular perimeter; and
a plurality of identical groups of spoke attachment holes defined in the hub body in a direction substantially parallel to the rotation axis, each group comprising at least three spoke attachment holes spaced at distances from each other, wherein the distance between any two spoke attachment holes in a first group is less than a distance separating any one of the spoke attachment holes in the first group from a nearest spoke attachment hole not belonging to the first group, wherein:
a first set of spoke attachment holes is located at a first radial distance from the rotation axis, and
a second set of spoke attachment holes is located at a second radial distance from the rotation axis, greater than the first radial distance.

21. A hub body for engagement with a bicycle wheel assembly, the hub body comprising:
a rotation axis;
two flanges extending radially with respect to the rotation axis of the hub body and axially spaced apart from each other, wherein at least one of the flanges has an inner axial surface extending radially outward at a first angle with respect to a plane perpendicular to the rotation axis and an outer axial surface extending radially outward at a second angle, greater than the first angle, with respect to a plane perpendicular to the rotation axis, such that an axial thickness of each flange decreases as the distance in the radial direction from the rotation axis increases and at least one of the flanges comprises lightening zones; and
a plurality of identical groups of spoke attachment holes defined in the flanges in a direction substantially parallel to the rotation axis, each group comprising at least three spoke attachment holes spaced at distances from each other, wherein the distance between any two spoke attachment holes in a first group is less than a distance separating any one of the spoke attachment holes in the first group from a nearest spoke attachment hole not belonging to the first group, wherein:
a first set of spoke attachment holes at a first radial distance from the rotation axis, and
a second set of spoke attachment holes at a second radial distance from the rotation axis, greater than the first radial distance.

22. A hub body for engagement with a bicycle wheel assembly, the hub body comprising:
a rotation axis;
two flanges extending radially with respect to the rotation axis of the hub body and axially spaced apart from each other, wherein at least one of the flanges has an inner axial surface extending radially outward at a first angle with respect to a plane perpendicular to the rotation axis and an outer axial surface extending radially outward at a second angle, greater than the first angle, with respect to a plane perpendicular to the rotation axis, such that an axial thickness an axial thickness of each flange decreases as the distance in the radial direction from the rotation axis increases and at least one of the flanges comprises lightening zones; and
a plurality of spoke attachment holes defined in the flanges in a direction substantially parallel to the rotation axis, the spoke attachment holes comprising
a first set of spoke attachment holes at a first radial distance from the rotation axis, and
a second set of spoke attachment holes at a second radial distance from the rotation axis, greater than the first radial distance,
wherein at least one of said flanges comprises identical groups of at least three of the spoke attachment holes spaced at distances from each other, the distance between any two spoke attachment holes in a first group being less than a distance separating any one of the spoke attachment holes in the first group from a nearest spoke attachment hole not belonging to the first group, and the lightening zones comprise openings through said at least one flange, the openings formed in zones of the flange located between two adjacent groups of spoke attachment holes.

23. A wheel assembly comprising:
a rim;
a hub body comprising
a rotation axis;
two flanges having circular perimeters and extending radially outward from the rotational axis, each flange comprising lightening zones defined by openings that interrupt the circular perimeter; and
a plurality of identical groups of spoke attachment holes defined in the hub body in a direction substantially parallel to the rotation axis, each group comprising at least three spoke attachment holes spaced at distances from each other, wherein the distance between any two spoke attachment holes in a first group is less than a distance separating any one of the spoke attachment holes in the first group from a nearest spoke attachment hole not belonging to the first group, the spoke attachment holes comprising
a first set of spoke attachment holes at a first radial distance from the rotation axis, and
a second set of spoke attachment holes at a second radial distance from the rotation axis, greater than the first radial distance; and
a plurality of spokes,
wherein each spoke is engaged at one end with a spoke attachment hole for securement to the hub body and each spoke is connected at its other end to the rim.

24. A wheel assembly comprising:
a rim;
a hub body comprising
   a rotation axis;
   two flanges having circular perimeters and extending radially outward from the rotational axis, each flange comprising lightening zones defined by openings that interrupt the circular perimeter; and
   a plurality of identical groups of spoke attachment holes defined in the hub body in a direction substantially parallel to the rotation axis, each group comprising at least three spoke attachment holes spaced at distances from each other, wherein the distance between any two spoke attachment holes in a first group is less than a distance separating any one of the spoke attachment holes in the first group from a nearest spoke attachment hole not belonging to the first group, the spoke attachment holes comprising
      a first set of spoke attachment holes at a first radial distance from the rotation axis, and
      a second set of spoke attachment holes at a second radial distance from the rotation axis, greater than the first radial distance; and
   a plurality of spokes,
wherein each spoke is engaged at one end with a spoke attachment hole for securement to the hub body and each spoke is connected at its other end to the rim, and the spokes are grouped in spoke groups of three parallel spokes.

25. A wheel assembly comprising:
a rim;
a hub body comprising
   a rotation axis,
   two flanges extending radially with respect to the rotation axis of the hub body and axially spaced apart from each other, wherein at least one of the flanges has an axial thickness that decreases as the distance in the radial direction from the rotation axis increases and at least one of the flanges comprises lightening zones, and
   a plurality of identical groups of spoke attachment holes defined in the flanges in a direction substantially parallel to the rotation axis, each group comprising at least three spoke attachment holes spaced at distances from each other, wherein the distance between any two spoke attachment holes in a first group is less than a distance separating any one of the spoke attachment holes in the first group from a nearest spoke attachment hole not belonging to the first group, and the spoke attachment holes comprising
      a first set of spoke attachment holes at a first radial distance from the rotation axis, and
      a second set of spoke attachment holes at a second radial distance from the rotation axis, greater than the first radial distance,
   wherein at least one of said flanges comprises identical groups of the spoke attachment holes, and the lightening zones comprise openings that interrupt a circular perimeter of said at least one flange, the openings formed in zones of the flange located between two adjacent groups of spoke attachment holes; and
a plurality of spokes,
   wherein each spoke is engaged at one end with a spoke attachment hole for securement to the hub body and each spoke is connected at its other end to the rim, and the spokes are grouped in spoke groups of three parallel spokes.

26. A bicycle hub comprising:
a tubular body that defines an axis of rotation and ends spaced apart by a predetermined distance;
two flanges, each flange positioned at a respective end of the tubular body, extending radially away from the axis of rotation, and having an inner axial surface and an outer axial surface, the inner axial surface extending radially outward at a first angle with respect to a plane perpendicular to the rotation axis, and the outer axial surface extending radially outward at a second angle, greater than the first angle, with respect to a plane perpendicular to the rotation axis, each flange defining a plurality of identical groups of spoke attachment holes on at least two centerlines parallel to the axis of rotation with one centerline at a radial distance R1 from the axis of rotation and the other centerline at a radial distance R2 from the axis of rotation, each group of spoke attachment holes comprising at least three spoke attachment holes spaced at distances from each other, wherein the distance between any two spoke attachment holes in a first group is less than a distance separating any one of the spoke attachment holes in the first group from a nearest spoke attachment hole not belonging to the first group.

27. The hub of claim 26 wherein at least one of the flanges has a decreased axial thickness as it extends away from the axis of rotation axis.

28. The hub of claim 27 wherein at least one of the flanges defines material lightened zones.

29. The hub of claim 26 wherein at least one of the flanges defines material lightened zones.

30. A bicycle hub comprising:
a tubular body that defines an axis of rotation and has two flanges, each flange defining a respective end of the tubular body;
a plurality of identical groups of spoke attachment holes having circular shapes defined in each flange on at least two centerlines parallel to the axis of rotation with one centerline at a radial distance R1 from the axis of rotation and the other centerline at a radial distance R2 from the axis of rotation, each group of spoke attachment holes comprising at least three spoke attachment holes defined in a common one of the flanges and spaced at distances from each other, wherein the distance between any two spoke attachment holes in a first group is less than a distance separating any one of the spoke attachment holes in the first group from a nearest spoke attachment hole not belonging to the first group; and
lightening zones defined by holes, separate from each spoke attachment hole, in at least one of the flanges between adjacent groups of spoke attachment holes.

31. The hub of claim 30 wherein at least one of the flanges has a decreased axial thickness as it extends away from the tubular body.

32. The hub of claim 31 wherein at least one of the flanges defines material lightened zones.

33. The hub of claim 30 wherein at least one of the flanges defines material lightened zones.

34. Hub body of a spoked bicycle wheel, comprising:
two flanges extending radially with respect to the rotation axis of the hub body and axially spaced apart from each other;
groups of spoke attachment holes, each spoke attachment hole having a circular shape, defined in at least one of the flanges in a direction substantially parallel to a rotation axis of the hub body, wherein the distance between any two spoke attachment holes in a first group is less than a distance separating any one of the spoke attachment holes in the first group from a nearest spoke attachment hole not belonging to the first group, each spoke attachment hole attaching an individual spoke to the rim, the groups of spoke attachment holes comprising a first set of spoke attachment holes at a first radial distance from the rotation axis and a second set of spoke attachment holes at a second radial distance from the rotation axis, greater than the first radial distance; and lightening zones comprising openings in the flanges, each opening limited by a corresponding connection bridge adjoining two flange portions having different groups of spoke attachment holes.

\* \* \* \* \*